US010616303B2

(12) United States Patent
Christiansen et al.

(10) Patent No.: US 10,616,303 B2
(45) Date of Patent: Apr. 7, 2020

(54) COMMUNICATION SYSTEM INCLUDING EAVESDROPPING

(71) Applicant: Sennheiser Communications A/S, Ballerup (DK)

(72) Inventors: Torben Christiansen, Ballerup (DK); Svend Feldt, Ballerup (DK); Bjarne Klemmensen, Smørum (DK)

(73) Assignee: SENNHEISER COMMUNICATIONS A/S, Ballerup (DK)

(*) Notice: Subject to any disclaimer, the term of this patent is extended or adjusted under 35 U.S.C. 154(b) by 99 days.

(21) Appl. No.: 15/908,332

(22) Filed: Feb. 28, 2018

(65) Prior Publication Data
US 2018/0255119 A1 Sep. 6, 2018

(30) Foreign Application Priority Data

Mar. 1, 2017 (EP) .................................... 17158663

(51) Int. Cl.
*H04L 29/06* (2006.01)
*G06F 3/16* (2006.01)
(Continued)

(52) U.S. Cl.
CPC ........ *H04L 65/608* (2013.01); *H04L 63/0428* (2013.01); *H04L 63/0442* (2013.01);
(Continued)

(58) Field of Classification Search
CPC ... H04L 65/608; H04L 65/605; H04L 65/607; H04L 65/403; H04L 63/0428;
(Continued)

(56) References Cited

U.S. PATENT DOCUMENTS 9,531,779 B2 * 12/2016 Pantos ................ H04L 65/4084
2005/0005297 A1 * 1/2005 Lee ........................ H04H 40/90
725/81
(Continued)

FOREIGN PATENT DOCUMENTS

| EP | 2 755 403 A1 | 7/2014 |
| EP | 3 051 771 A1 | 8/2016 |
| WO | 2014/086388 A1 | 6/2014 |

OTHER PUBLICATIONS anonymous, "Connect a Smartphone to Your Car Stereo," Mar. 2013, TechGuy Labs, web.archive.org/web/20130327015454/https://techguylabs.com/blog/connect-smartphone-your-car-stereo (Year: 2013).*

(Continued)

*Primary Examiner* — Ruolei Zong
(74) *Attorney, Agent, or Firm* — Birch, Stewart, Kolasch & Birch, LLP

(57) ABSTRACT

The disclosure presents a method and a communication system comprising; an audio gateway including; a first wireless interface configured to transmit and receive an audio signal via a first communication link, a processing unit configured to transfer the audio signal into an audio streaming signal, a second wireless interface configured to transmit the audio streaming signal via a second communication link, a plurality of communication units comprising a master communication unit and at least a first slave communication unit, wherein each of the communication unit comprises: a first wireless interface configured to receive the audio streaming signal via the second communication link and to communicate with a communication unit, a speaker configured to sound the audio streaming signal received from the audio gateway, a memory unit, and wherein the master communication unit is configured to transmit a pairing request via the second communication link to the audio (Continued)

gateway, and the audio gateway transmits then an encryption key to the master communication unit, and the first slave communication unit is configured to request the encryption key by transmitting an encryption request including an identification of the first slave communication unit to the master communication unit via a first internal communication link, and the master communication unit transmits then the encryption key relating to the second communication link to the first slave communication unit based on an access criteria, and the first slave communication unit is then configured to eavesdrop the audio streaming signal being communicated via the second communication link between the audio gateway and the master communication unit.

15 Claims, 4 Drawing Sheets

(51) Int. Cl.
| | | |
|---|---|---|
| *H04W 12/00* | (2009.01) | |
| *H04N 21/439* | (2011.01) | |
| *H04W 84/20* | (2009.01) | |
| *H04L 12/66* | (2006.01) | |
| *H04L 12/853* | (2013.01) | |
| *H04W 88/16* | (2009.01) | |

(52) U.S. Cl.
CPC .......... *H04L 63/064* (2013.01); *H04L 65/403* (2013.01); *H04N 21/439* (2013.01); *H04W 12/003* (2019.01); *H04L 12/66* (2013.01); *H04L 47/2416* (2013.01); *H04W 84/20* (2013.01); *H04W 88/16* (2013.01)

(58) Field of Classification Search
CPC ... H04L 63/0442; H04L 63/064; H04L 12/66; H04L 47/2416; H04N 21/439; H04W 12/003; H04W 84/20; H04W 88/16
USPC .......................................................... 709/231
See application file for complete search history.

(56) References Cited

U.S. PATENT DOCUMENTS

| | | | | |
|---|---|---|---|---|
| 2008/0205664 | A1* | 8/2008 | Kim | H04M 1/6066 381/77 |
| 2013/0254519 | A1 | 9/2013 | Benoit et al. | |
| 2014/0029701 | A1* | 1/2014 | Newham | H04L 7/041 375/340 |
| 2015/0172757 | A1* | 6/2015 | Kafle | H04L 67/1044 725/81 |
| 2015/0319557 | A1* | 11/2015 | El-Hoiydi | H04R 25/556 455/41.2 |
| 2016/0112825 | A1* | 4/2016 | Miller | H04W 12/04 455/41.2 |
| 2016/0234214 | A1* | 8/2016 | Sethi | H04L 63/06 |
| 2018/0014145 | A1* | 1/2018 | Seaman | H04W 4/023 |

OTHER PUBLICATIONS

Jason Rich, "Using Your iPhone or iPad with Wireless Speakers," Oct. 2013, InformIT, web.archive.org/web/20131002195130/http://www.informit.com/articles/article.aspx?p=2130758 (Year: 2013).*

* cited by examiner

COMMUNICATION SYSTEM INCLUDING EAVESDROPPING

TECHNICAL FIELD

The disclosure relates to a communication system where at least a first slave communication unit is configured to eavesdrop an audio streaming signal between an audio gateway and a master communication unit.

BACKGROUND

The technical field of the present disclosure is within communication system for telephone conference.

It is known in today solutions that if using a smartphone as your audio gateway it is only possible to pair the smartphone, via for example Bluetooth, to a single communication unit, for example a speakerphone.

This problem has been solved by a communication system which is based by Voice over Internet protocol (VoIP). Thereby, multiple users are able to join a telephone conference.

However, the disadvantage of this VoIP based systems is that the system demands several of highly expensive communication units, such as a smartphone with internet connection or a laptop with internet access. A further disadvantage is the high latency between the voice being captured by the microphone of the smartphone and played by the speakers in the smartphone and the other communication units configured to the communication system.

SUMMARY

An object of the present disclosure is to provide a communication system which allows a slave communication unit to eavesdrop a communication between an audio gateway, such as a smartphone, a computer, a tablet or any telecommunicating device, and a master communication unit.

A further object of the present disclosure is to provide a solution to the previous object which allows the audio gateway to establish multiple communication links between the master communication unit and between the slave communication unit.

Objects of the present disclosure are achieved by the present disclosure described in the accompanying claims and as described in the following.

An object of the present disclosure is achieved by a communication system comprising an audio gateway including a first wireless interface configured to transmit and receive an audio signal via a first communication link, a processing unit configured to transfer the audio signal into an audio streaming signal, a second wireless interface configured to transmit the audio streaming signal via a second communication link, a plurality of communication units comprising a master communication unit and at least a first slave communication unit. Furthermore each of the communication unit comprises a first wireless interface configured to receive the audio streaming signal via the second communication link and to communicate with another communication unit, a speaker configured to sound the audio streaming signal received from the audio gateway, a memory unit, and wherein the master communication unit is configured to transmit a pairing request via the second communication link to the audio gateway, and the audio gateway transmits then an encryption key to the master communication unit, and the first slave communication unit may be configured to request the encryption key by transmitting an encryption request including an identification of the first slave communication unit to the master communication unit via a first internal communication link, and the master communication unit transmits then the encryption key relating to the second communication link to the first slave communication unit based on an access criteria, and the first slave communication unit may then be configured to eavesdrop the audio streaming signal being communicated via the second communication link between the audio gateway and the master communication unit.

The communication system may for example be used in a telephone conference, where the audio gateway may be a laptop or a smartphone connected to an internet network or a telephone network via the first communication link. The audio gateway may then be connected to a first slave communication unit via the second communication link, wherein the first slave communication unit may be a speaker-microphone unit or a speakerphone which can be placed on a table and connected to the audio gateway via the second communication link. The second communication link could be a Bluetooth link or a DECT link or any link based on a short range communication protocol. The table could be a 4 to 6 meter long table surrounded by several people wanting to join the telephone conference.

The speaker in the first slave communication unit may not be able to reach out to all of the people sitting around the table, i.e. around the first slave communication unit, and thereby, some of the people may then not be able to hear the output from the speaker. In order to avoid this, a first slave communication unit may then be applied on the table in order to improve the ability of the people, which were not able to hear the telephone conversation. The first slave communication unit is then the master communication unit, since the first slave communication unit has established a paired communication to the audio gateway A first slave communication unit is then placed on the table, and the first slave communication unit transmits the request of the encryption key to the master communication unit. The master communication unit transmits the encryption key, and the first slave communication unit is then able to eavesdrop on the second communication link, and thereby, the second slave communication unit is then able to eavesdrop the audio streaming signal which comprises the voice or voices of the people speaking on the other end of the first communication link. The first slave communication unit has established a none-paired communication to the audio gateway For example, the second communication link is based on Bluetooth protocol, and due to the configuration of the Bluetooth protocol communication between the audio gateway and multiple communication units, simultaneously, is not allowed. With the present disclosure, it is not necessary for the audio gateway to be paired with both the master communication unit and the at least first slave communication unit in order for the first slave communication unit to receive the audio streaming signal from the audio gateway. In this example, the first slave communication unit is able to listen to the second communication link without the audio gateway noticing and which is provided by the none-paired communication link to the second communication link, i.e. the first slave communication is then configured to eavesdrop the second communication link.

The audio gateway may for example be a smartphone, a computer, a laptop, a tablet or any telecommunicating device which may be configured to communicate via a telephone network, internet, IP-telephone or any other telecommunicating device which is configured to communicate via a long-range communication network.

The communication unit, which can either be a master or a slave communication unit, may be a headset, a headphone, a speakerphone which is a table-microphone unit, or any speaker-microphone unit which is not a hearing aid which is configured to compensate for a hearing loss of a user, i.e. a hearing impaired.

The essence of the present disclosure is to solve a problem of improving the listening of the people being in a situation where a speaker of a communication unit configured to output an telephone conversation is not able to play the telephone conversation in a way that every people are able to hear the telephone conversation. The solution is to distribute the audio streaming signal between the audio gateway and the master communication unit via eavesdropping which is allowed by sharing, for example an encryption key between the communication units.

When the communication units are headphones, then the advantage of the present disclosure is that an audio signal comprising music or any sound can be easily distributed between the communication units.

A major advantages of the system is that the latency of the audio streaming signal being played in the multiple communication units is reduced to nothing. In a system where each of the communication units are paired directly to the audio gateway will experience a latency between the communication units, meaning that the audio streaming signal is being played on the communication units with a time delay in between the communication unit.

The audio signal being transmitted via the first communication link may comprise speech or speeches from one or more users of another audio gateway connected to the other end of the first communication link. Alternatively, the audio signal may comprise music. In this example, the music may then be played on the communication units simultaneously.

The audio streaming signal may comprise a mono audio signal or a stereo audio signal.

The first communication link may be a telephone link in a telephone network, or a communication link in an IP-telephony network or in a Voice over internet protocol (VOIP) network, The second communication link, the first internal communication link, and the second internal communication link may all be based on a short range communication protocol, such as Bluetooth, DECT or any kind of short range communication protocol having a communication frequency range between 1.88 GHz to 5.5 GHz, or between 2.45 GHz to 5.5 GHz.

The master communication unit may be configured differently than the slave communication unit. The master communication unit may act as a communication gateway of the slave communication units to the audio gateway. The master communication unit may be configured to allow the communication unit to join the communication between the master communication unit and the audio gateway.

The pairing process may be configured to a short range communication protocol, such as Bluetooth, DECT or any kind of short range communication protocol having a communication frequency range between 1.88 GHz to 5.5 GHz, or between 2.45 GHz to 5.5 GHz. The pairing request may be configured to the pairing process of the short range communication protocol.

The encryption request includes the identification of the communication unit transmitting the encryption request. The identification may be a serial number, an IP number or any number identifying the communication unit The communication unit may comprise a microphone configured to receive a voice of a user and provide a first microphone signal including the voice of one or more users, and wherein the first wireless interface may be configured to transmit the first microphone signal via a third internal communication link and/or to receive a second microphone signal via the third internal communication link. The communication unit may further comprise a combiner unit configured to combine the first microphone signal with at least the second microphone signal, and wherein the master communication unit is configured to combine the first microphone signal with at least the second microphone signal from the first slave communication unit into a combined microphone signal, and wherein the master communication unit is then configured to transmit the combined microphone signal via the second communication link to the audio gateway.

The combiner unit may be a mixer. The communication unit may comprise a compressor.

The advantage of combining the microphone signals into the combined microphone signal and then transmit it via the second communication link to the audio gateway via the master communication unit, is that the latency between the microphone signals is reduced significantly compared to a situation where the second microphone signal of the first slave communication unit and the first microphone signal of the master communication unit are transmitted directly to the audio gateway.

A further advantage is that the latency between the voice being captured by the microphone and played by the speakers in the communication system is significantly less compared to VoIP based communication system.

The access criteria may be based on a comparison between the identification received by the master communication unit and one or more identifications stored in an identification list in the memory unit of the master communication unit. Then if the comparison fulfils a matching criteria then the master communication unit transmits the encryption key to the respective slave communication unit. The matching criteria may be a complete match between the two compared identifications.

The identification list may include a primary sub-list and a secondary sub-list, wherein the communication units which its identification is part of the primary sub-list are configured differently than the communication units which its identification is part of the secondary sub-list. The primary sub-list may comprise identification of communication units which have been allowed to eavesdrop and to be part of the communication via the microphone on the respective communication unit. Furthermore, the communication units being part of the primary sub-list is configured to take over the role of the master communication unit, if the master communication unit somehow is no longer part of the communication to the audio gateway. The communication unit being part of the secondary sub-list may not be able to use its microphone if any, or the communication unit is not able to take over the role of the master communication unit, if the master communication unit leaves the communication to the audio gateway.

Additionally, the user of the audio gateway or the master communication unit may be able to classify the communication between the master communication unit and the audio gateway to be subject to a certain security constraint. The communication units being part of the primary sub-list are able to eavesdrop the communication on the second communication link, and where the communication units being part of the secondary sub-list are not able to eavesdrop on the communication between the master communication unit and the audio gateway.

The sub-lists or the identification list may be predetermined and pre-stored by the manufacture of the communication unit, or the sub-lists or the identification list may be transmitted by the audio gateway unit and the second communication link and then stored on the memory unit in the communication unit.

The advantage of having sub-lists is that the user of the audio gateway or the master communication unit is able to control who and how much a user of a slave communication unit can attend the conversation via the second communication link.

A slave communication unit being able to eavesdrop the audio streaming signal being communicated via the second communication link means that the slave communication unit is able to listen to the audio streaming signal.

The audio streaming signal may be communicated to the master communication unit via a first channel in the second communication link, and the first slave communication unit is configured to eavesdrop a second channel of the second communication link.

The master communication unit or the audio gateway may be configured to decide which of the communication units should play which channels.

By dividing the second communication link into multiple channels allows the possibility of controlling the eavesdropping from either the master communication unit, the audio gateway or any other controlling unit, such as a computer, a server etc. The controlling of the eavesdropping may for example include restricting the eavesdropping to none confidential audio contain in the audio streaming.

The communication system may comprise a second slave communication unit configured to request the encryption key by transmitting an encryption request including an identification of the second slave communication unit either by directly communication to the master communication unit via a second internal communication link, or indirectly communication to the master communication unit via the second internal communication link, to the first slave communication unit and then via the first internal communication unit. The master communication unit is further configured to transmit the encryption key, based on the access criteria, either by directly communication to the second slave communication unit via the second internal communication link, or directly communication to the second slave communication unit via the first internal communication unit, to the first slave communication unit and then via the second internal communication link, and wherein the second slave communication unit is then configured to eavesdrop the audio streaming signal being communicated via the second communication link between the audio gateway and the master communication unit.

The communication system may comprise multiple communication units, for example at least 2, 4, 10, or 20 communication units.

The advantage of having the indirect communication between the master communication unit and the second slave communication unit is that the wireless interface of the communication unit, i.e. in this example the second slave communication unit, and/or the internal communication links to the master communication unit will not become unstable when the communication system comprises several communication units, such as 5 to 10 or more communication units.

The first communication link may be a long range communication link in a telephone network, an internet network, a wide area network etc.

The second communication link and/or any of the internal communication links between the communication units, may be a short range communication link, such as Bluetooth, DECT or any short range communication link which has a frequency between 1.88 GHz and 5.5 GHz or between 2.45 GHz and 5.5 GHz.

The internal communication links may be the first internal communication link, the second internal communication link, the third internal communication link and/or the fourth internal communication link.

The second slave communication unit may be configured to either transmit a third microphone signal directly to the master communication unit via a fourth internal communication link or indirectly to the master communication unit via the fourth internal communication link, to the first slave communication unit and then via the third internal communication link.

When the third microphone signal of the second slave communication unit is transmitted via the first slave communication unit to the master communication unit, then the first slave communication unit is configured to combine the third microphone signal of the second slave communication unit and the second microphone signal of the first slave communication unit into a new microphone signal being transmitted to the master communication unit.

The communication unit may be a headset, a speaker phone or a headphone.

The audio gateway may be a smartphone, a laptop, a PC or a tablet.

A further object of the present disclosure is achieved by a method of providing a communication system where at least a first slave communication unit is configured to eavesdrop an audio streaming signal between an audio gateway and a master communication unit. The method comprising receiving an audio signal at the audio gateway via a first communication link, transferring the audio signal into an audio streaming signal, transmitting a pairing request by the master communication unit to the audio gateway, receiving an encryption key at the master communication unit transmitted by the audio gateway, transmitting the audio streaming signal from the audio gateway to the master communication unit via the second communication link, transmitting an encryption request by the first slave communication unit to the master communication unit, where the encryption request includes an identification of the first slave communication unit, transmitting the encryption key relating to the second communication link by the master communication unit to the first slave communication unit based on an access criteria, and wherein the first slave communication unit is then configured to eavesdrop the audio streaming signal being communicated via the second communication link between the audio gateway and the master communication unit.

A second slave communication unit may be configured to request the encryption key by transmitting an encryption request including an identification of the second slave communication unit either by communicating directly to the master communication unit via a second internal communication link, or communicating indirectly to the master communication unit via the second internal communication link, to the first slave communication unit and then via the first internal communication unit. The master communication unit is then configured to transmit the encryption key, based on the access criteria, either by communicating directly to the second slave communication unit via the second internal communication link, or communicating indirectly to the second slave communication unit via the first internal communication unit, to the first slave communication unit and then via the second internal communication link, and wherein the second slave communication unit is then configured to eavesdrop the audio streaming signal being communicated via the second communication link between the audio gateway and the master communication unit.

Each of the communication unit receiving a voice of a user via a microphone and providing a first microphone signal including the voice of one or more users, and wherein the first wireless interface is transmitting the first microphone signal via a third internal communication link and/or receiving a second microphone signal via the third internal communication link, combining the first microphone signal with at least the second microphone signal via a combiner unit, and wherein the master communication unit is configured to combine the first microphone signal with at least the second microphone signal from the first slave communication unit into a combined microphone signal, and wherein the master communication unit is then configured to transmit the combined microphone signal via the second communication link to the audio gateway.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follows.

Figure 1A:
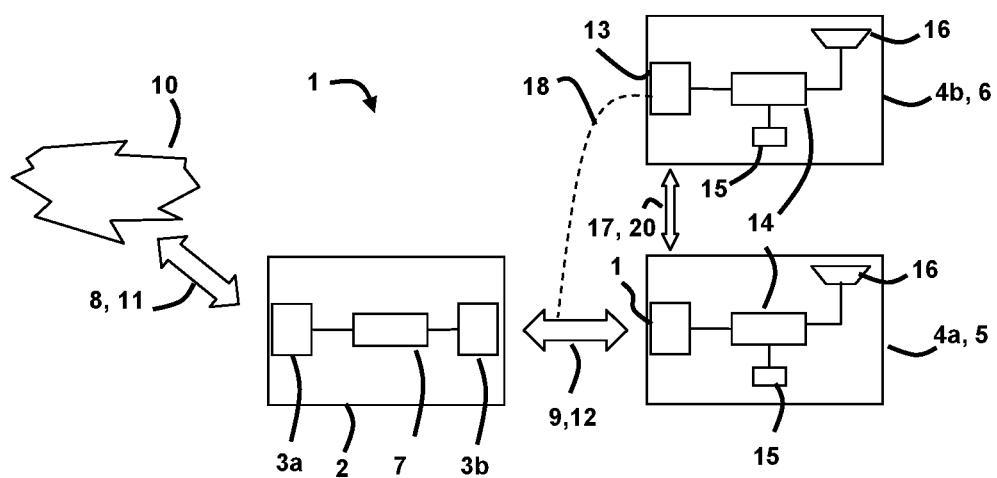
FIGS. 1a-1b, illustrate an example of a communication system.
Figure 1B:
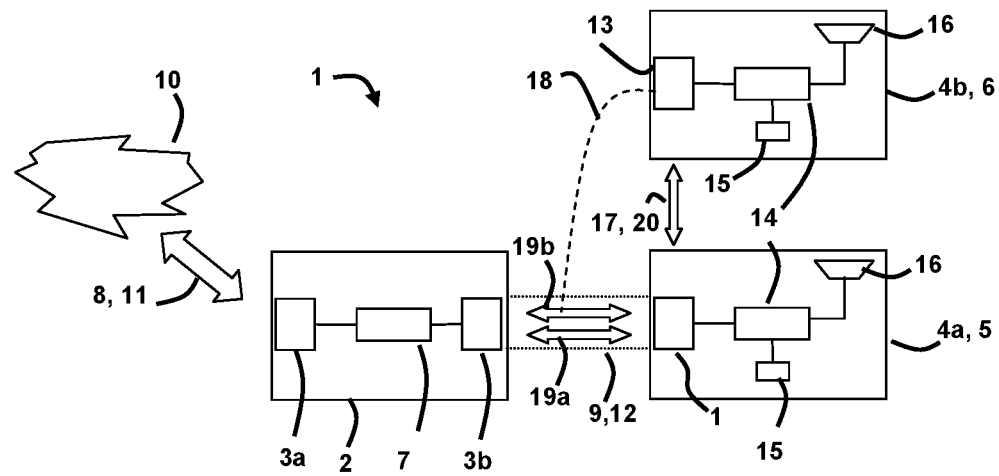

FIGS. 1a and 1b show the communication system 1 including an audio gateway 2 which comprises a first wireless interface 3a configured to transmit and receive an audio signal 11 via a first communication link 8. TH audio signal 11 is then processed in a processing unit configured 7 and transferred into an audio streaming signal 12. After the processing, then a second wireless interface 3b will transmit the audio streaming signal 12 via a second communication link 9 to a master communication unit 5. The communication system 1 comprises a plurality of communication units (4a, 4b) comprising the master communication unit 5 and at least a first slave communication unit 6. Both communication units (4a,4b, 5, 6) comprises a first wireless interface 13 configured to receive the audio streaming signal 12 via the second communication link 9 and to communicate with another communication unit (4a,4b, 5, 6). Furthermore, the communication unit comprises a speaker 16 configured to sound the audio streaming signal 12 received from the audio gateway 2 and a memory unit 15. In order for the master communication unit 5 to communicate with the audio gateway 2, then the master communication unit 5 shall transmit a pairing request via the second communication link 9 to the audio gateway 2, and the audio gateway 2 transmits then an encryption key to the master communication unit 5. In order for the first slave communication unit to eavesdrop on the second communication link 9, then the first slave communication unit 6 requests the encryption key 20 by transmitting an encryption request including an identification of the first slave communication unit 6 to the master communication unit 5 via a first internal communication link 17. In response to the encryption request the master communication unit 5 transmits then the encryption key 20 relating to the second communication link 9 to the first slave communication unit 6 based on an access criteria. The first slave communication unit 6 is then configured to eavesdrop 18 the audio streaming signal 12 being communicated via the second communication link 9 between the audio gateway 2 and the master communication unit 5.

In FIG. 1b the audio streaming signal 12 is communicated to the master communication unit 5 via a first channel 19a in the second communication link 9 and the first slave communication unit 6 is configured to eavesdrop 18 a second channel 19b of the second communication link 9.

The master communication unit 5 or the audio gateway 2 is configured to decide which of the communication units (4a, 4b, 5, 6) should play which channels (19a, 19b).

Figure 2A:
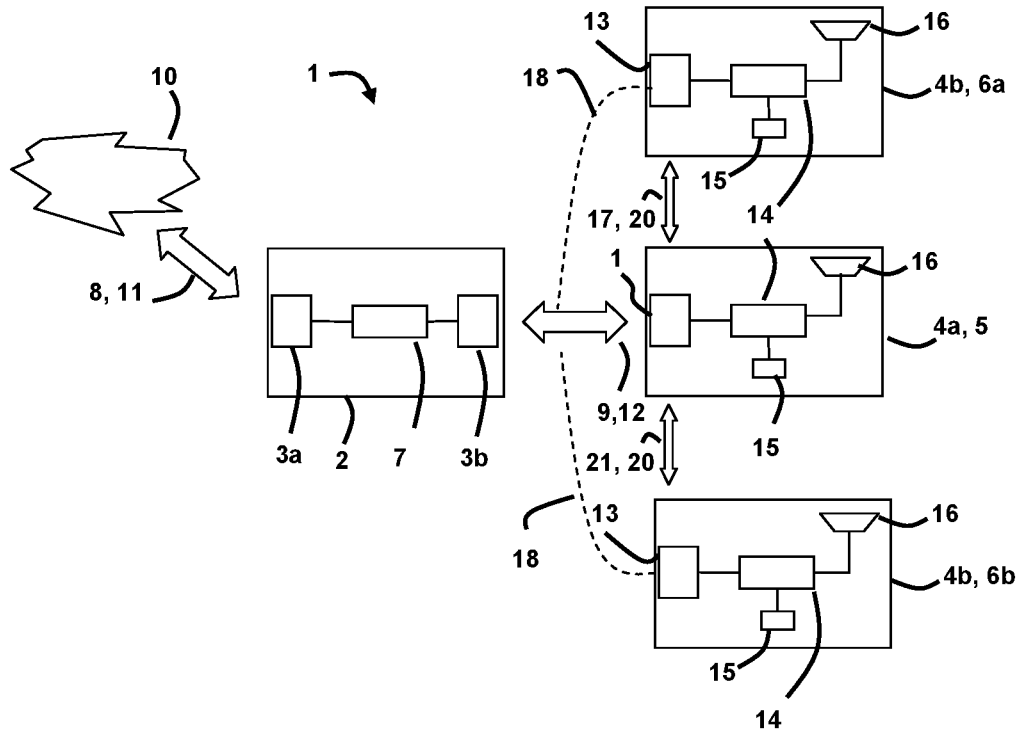
FIGS. 2a-2b, illustrate a further example of a communication system.
Figure 2B:
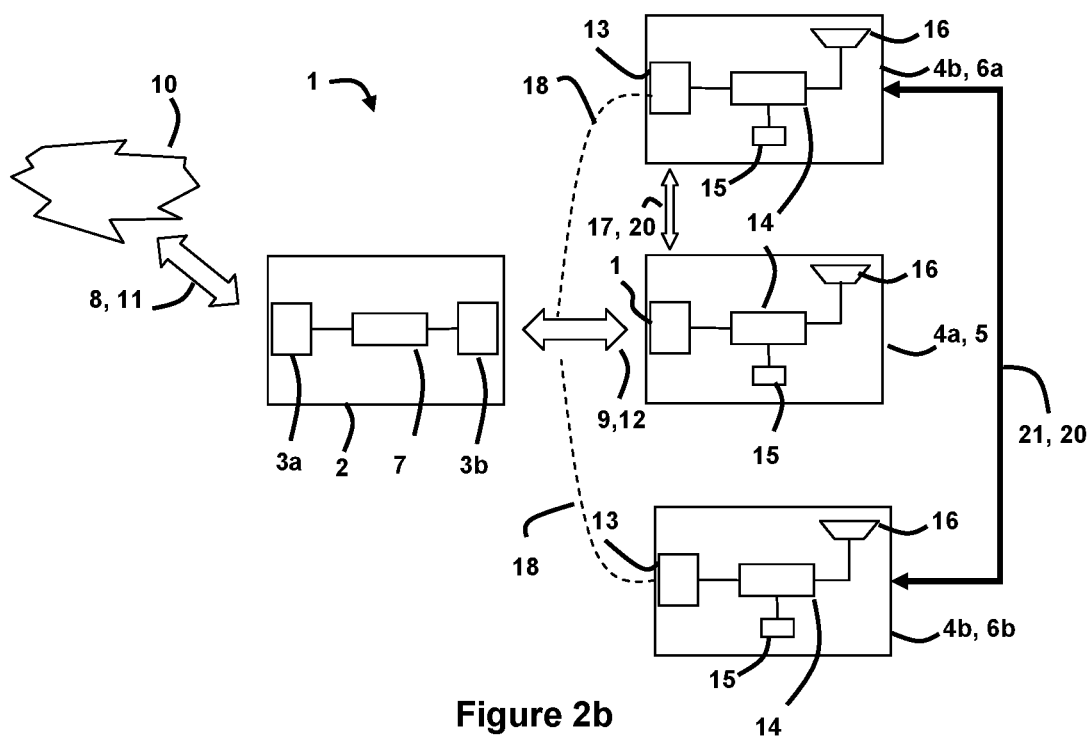

FIGS. 2a and 2b show the communication system 1 including a second slave communication unit (6b). The second slave communication unit 6b is configured to request the encryption key 20 by transmitting an encryption request including an identification of the second slave communication unit 6b either by directly communication to the master communication unit 5 via a second internal communication link 21, see specifically FIG. 2a, or by indirectly communication to the master communication unit 5 via the second internal communication link 21, to the first slave communication unit (6, 6a) and then via the first internal communication unit (17), see specifically FIG. 2b. The master communication unit 5 is configured to transmit the encryption key 20, based on the access criteria, either by directly communication to the second slave communication unit 6b via the second internal communication link 21, see specifically FIG. 2a, or by indirectly communication to the second slave communication unit 6b via the first internal communication unit 17, to the first slave communication unit 6a and then via the second internal communication link (21), aww specifically FIG. 2b. The second slave communication unit 6b is then configured to eavesdrop 18 the audio streaming signal 12 being communicated via the second communication link 9 between the audio gateway 2 and the master communication unit 5.

The access criteria is based on a comparison between the identification received by the master communication unit 5 and one or more identifications stored in an identification list in the memory unit 15 of the master communication unit 5, then if the comparison fulfils a matching criteria then the master communication unit 5 transmits the encryption key 20 to the respective slave communication unit (6a, 6b).

The identification list includes a primary sub-list and a secondary sub-list, wherein the communication units (4a, 4b, 5, 6a, 6b) which its identification is part of the primary sub-list are configured differently than the communication units (4a, 4b, 5, 6a, 6b) which its identification is part of the secondary sub-list.

The second communication link (9) and/or any of the internal communication links (17, 21) between the communication units (4a, 4b, 5, 6a, 6b), is a short range communication link, such as Bluetooth, DECT or any short range communication link which has a frequency between 1.88 GHz and 5.5 GHz or between 2.45 GHz and 5.5 GHz.

Figure 3A:
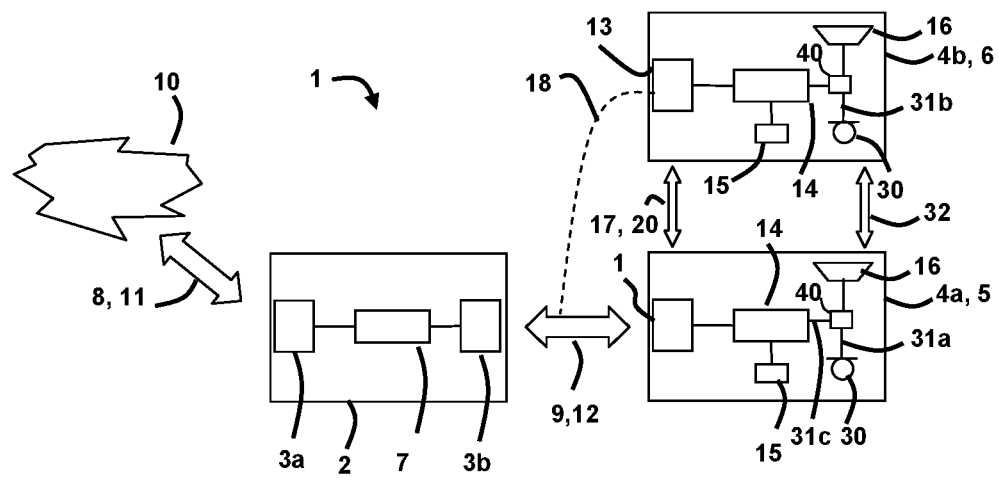
FIGS. 3a-3b, illustrate an even further example of a communication system.
Figure 3B:
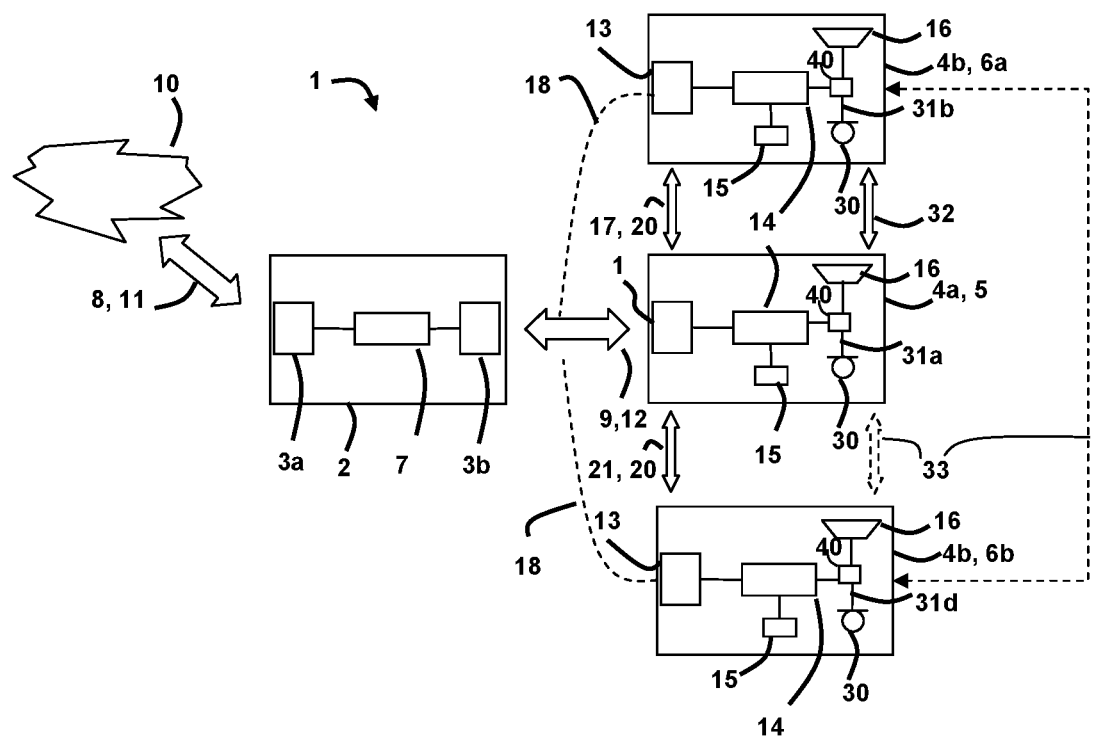

FIGS. 3a and 3b show the communication system 1, where the communication units (5, 6a, 6b) comprises a microphone 30. The microphone 30 is configured to receive a voice of a user and provide a first microphone signal 31a including the voice of one or more users. The first wireless interface 13 is configured to transmit the first microphone signal 31a via a third internal communication link 32 and/or to receive a second microphone signal 31a via the third internal communication link 32. The communication units comprises a combiner unit 40 configured to combine the first microphone signal 31a with at least the second microphone signal 31b. The master communication unit 5 is configured to combine the first microphone signal 31a with at least the second microphone signal 31b from the first slave communication unit 6a into a combined microphone signal 31c, and wherein the master communication unit 5 is further configured to transmit the combined microphone signal 31c via the second communication link 9 to the audio gateway 2.

In FIG. 3b, the second slave communication unit 6b is configured to either transmit a third microphone signal 31d directly to the master communication unit 5 via a fourth internal communication link 33, or indirectly to the master communication unit 5 via the fourth internal communication link 33, to the first slave communication unit 6a and then via the third internal communication link 32.

In all examples of the communication system 1, the communication unit (4a, 4b, 5, 6a, 6b) is a headset, a speaker phone or a headphone, and the audio gateway 2 is a smartphone, a laptop, a PC or a tablet.

Figure 4:
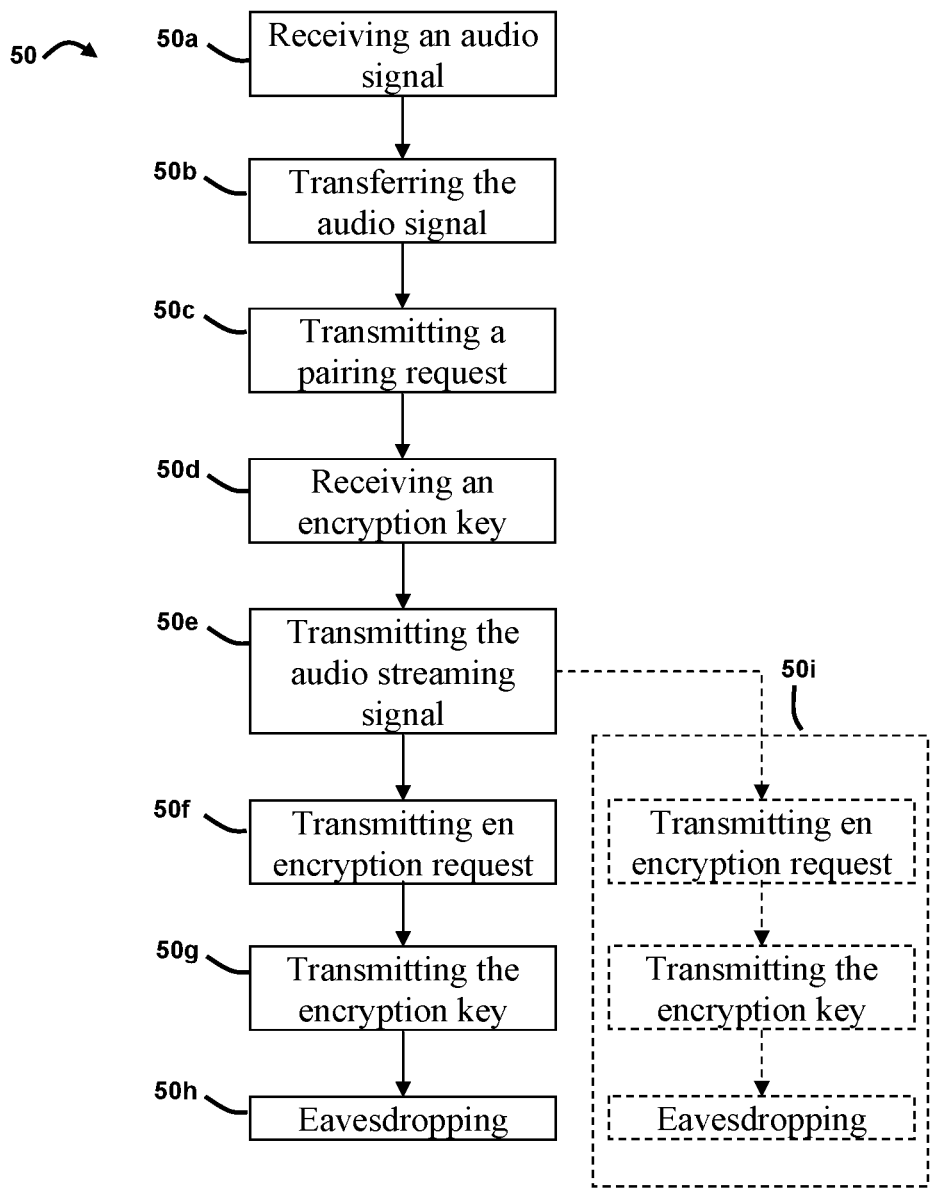
FIG. 4, illustrates a flow diagram of a method of providing a communication system.

FIG. 4 illustrates a flow diagram of a method 50 of providing a communication system 1 where at least a first slave communication unit (6a,6) is configured to eavesdrop 18 an audio streaming signal 12 between an audio gateway 2 and a master communication unit 5, wherein the method comprising;
- (50a) receiving an audio signal 11 at the audio gateway 2 via a first communication link 8,
- (50b) transferring the audio signal 2 into an audio streaming signal 12,
- (50c) transmitting a pairing request by the master communication unit 5 to the audio gateway 2,
- (50d) receiving an encryption key 20 at the master communication unit 5 transmitted by the audio gateway 2,
- (50e) transmitting the audio streaming signal 12 from the audio gateway 2 to the master communication unit 5 via the second communication link 9,
- (50f) transmitting an encryption request by the first slave communication unit (6a, 6) to the master communication unit 5, where the encryption request includes an identification of the first slave communication unit (6a, 6),
- (50g) transmitting the encryption key 20 relating to the second communication link 9 by the master communication unit 5 to the first slave communication unit (6a, 6) based on an access criteria, and wherein the first slave communication unit (6a, 6) is then configured to eavesdrop (18, 50h) the audio streaming signal 12 being communicated via the second communication link 9 between the audio gateway 2 and the master communication unit 5.

Optionally, (50i) a second slave communication unit 6b is configured to request the encryption key 20 by transmitting an encryption request including an identification of the second slave communication unit 6b, and wherein the master communication unit 5 is then configured to transmit the encryption key 20 to the second slave communication unit 6b, based on the access criteria. The second slave communication unit 6b is then configured to eavesdrop 18 the audio streaming signal 12 being communicated via the second communication link 9 between the audio gateway 2 and the master communication unit 5.

The invention claimed is:
1. A communication system comprising:
an audio gateway including:
  a first wireless interface configured to transmit and receive an audio signal via a first communication link,
  a processing unit configured to transfer the audio signal into an audio streaming signal, and
  a second wireless interface configured to transmit the audio streaming signal via a second communication link; and
a plurality of communication units comprising a master communication unit and at least a first slave communication unit, wherein each of the communication units comprises:
  a first wireless interface configured to receive the audio streaming signal and to communicate with another communication unit, a speaker configured to sound the audio streaming signal, a memory unit, wherein the first wireless interface of the master communication unit is configured to receive the audio streaming signal from the audio gateway via the second communication link, wherein the master communication unit is configured to transmit a pairing request via the second communication link to the audio gateway, and the audio gateway transmits then an encryption key to the master communication unit, and wherein the first slave communication unit is configured to request the encryption key by transmitting an encryption request including an identification of the first slave communication unit to the master communication unit via a first slave communication link established between at least two of the plurality of communication units, and the master communication unit transmits then the encryption key relating to the second communication link to the first slave communication unit based on an access criteria, wherein the access criteria is based on a comparison between the identification of the first slave communication unit received by the master communication unit and one or more identifications stored in an identification list in the memory unit of the master communication unit, then if the comparison fulfils a matching criteria then the master communication unit transmits the encryption key to the first slave communication unit, and wherein the first slave communication unit is then configured to eavesdrop the audio streaming signal being communicated via the second communication link between the audio gateway and the master communication unit, and transmit audio signals to the audio gateway via the master communication unit.

2. A communication system according to claim 1, wherein the audio streaming signal is communicated to the master communication unit via a first channel in the second communication link and the first slave communication unit is configured to eavesdrop a second channel of the second communication link.

3. A communication system according to claim 2, wherein the master communication unit or the audio gateway is configured to decide which of the communication units should play which channels.

4. A communication system according to claim 1, comprising a second slave communication unit configured to request the encryption key by transmitting an encryption request including an identification of the second slave communication unit either by:

direct communication to the master communication unit via a second slave communication link, or indirect communication to the master communication unit via the second slave communication link to the first slave communication unit and then via the first slave communication link, wherein the master communication unit is then configured to transmit the encryption key, based on the access criteria, either by:

direct communication to the second slave communication unit via the second slave communication link, or indirect communication to the second slave communication unit via the first slave communication link to the first slave communication unit and then via the second slave communication link, and wherein the second slave communication unit is then configured to eavesdrop the audio streaming signal being communicated via the second communication link between the audio gateway and the master communication unit.

5. A communication system according to claim 1, wherein the first communication link is a long range communication link in a telephone network, an internet network or a wide area network.

6. A communication system according to claim 1, wherein the second communication link or the first slave communication link is a short range communication link which has a frequency between 1.88 GHz and 5.5 GHz or between 2.45 GHz and 5.5 GHz.

7. A communication system according to claim 1, wherein each of the communication unit comprises:

a microphone configured to receive a voice of a user and provide a first microphone signal including the voice of one or more users, and wherein the first wireless interface is configured to transmit the first microphone signal via a third slave communication link and/or to receive a second microphone signal via the third slave communication link, and wherein the master communication unit is configured to combine the first microphone signal with at least the second microphone signal from the first slave communication unit into a combined microphone signal, and wherein the master communication unit is then configured to transmit the combined microphone signal via the second communication link to the audio gateway.

8. A communication system according to claim 4, wherein the second slave communication unit is configured to either transmit a third microphone signal directly to the master communication unit via a fourth slave communication link or indirectly to the master communication unit via the fourth slave communication link, to the first slave communication unit and then via the third slave communication link.

9. A communication system according to claim 1, wherein the communication unit is a headset, a speaker phone or a headphone.

10. A communication system according to claim 1, wherein the audio gateway is a smartphone, a laptop, a PC or a tablet.

11. A communication system according to claim 2, comprising a second slave communication unit configured to request the encryption key by transmitting an encryption request including an identification of the second slave communication unit either by:

direct communication to the master communication unit via a second slave communication link, or indirect communication to the master communication unit via the second slave communication link to the first slave communication unit and then via the first slave communication link, and wherein the master communication unit is then configured to transmit the encryption key, based on the access criteria, either by:

direct communication to the second slave communication unit via the second slave communication link, or indirect communication to the second slave communication unit via the first slave communication link to the first slave communication unit and then via the second slave communication link, and wherein the second slave communication unit is then configured to eavesdrop the audio streaming signal being communicated via the second communication link between the audio gateway and the master communication unit.

12. A communication system according to claim 3, comprising a second slave communication unit configured to request the encryption key by transmitting an encryption request including an identification of the second slave communication unit either by:
  direct communication to the master communication unit via a second slave communication link, or
  indirect communication to the master communication unit via the second slave communication link to the first slave communication unit and then via the first slave communication link,
  and wherein the master communication unit is then configured to transmit the encryption key, based on the access criteria, either by:
    direct communication to the second slave communication unit via the second slave communication link, or
    indirect communication to the second slave communication unit via the first slave communication link to the first slave communication unit and then via the second slave communication link,
  and wherein the second slave communication unit is then configured to eavesdrop the audio streaming signal being communicated via the second communication link between the audio gateway and the master communication unit.

13. A method of providing a communication system where at least a first slave communication unit includes a wireless interface configured to eavesdrop an audio streaming signal between an audio gateway and a master communication unit, the method comprising:
  receiving an audio signal at the audio gateway via a first communication link,
  transferring the audio signal into an audio streaming signal,
  transmitting a pairing request by a wireless interface in the master communication unit to the audio gateway,
  receiving an encryption key at the wireless interface in master communication unit, the encryption key being transmitted by the audio gateway,
  transmitting the audio streaming signal from the audio gateway to the master communication unit via the second communication link,
  transmitting an encryption request by the first slave communication unit to the master communication unit, where the encryption request includes an identification of the first slave communication unit, and
  transmitting the encryption key relating to the second communication link by wireless interface in the master communication unit to the first slave communication unit based on an access criteria,
  wherein the access criteria is based on a comparison between the identification of the first slave communication unit received by the master communication unit and one or more identifications stored in an identification list in the memory unit of the master communication unit, then if the comparison fulfils a matching criteria then the master communication unit transmits the encryption key to the first slave communication unit, and
  wherein the first slave communication unit is then configured to
    eavesdrop the audio streaming signal being communicated via the second communication link between the audio gateway and the master communication unit, and
    transmit audio signals to the audio gateway via the master communication unit.

14. A method according to claim 13, further comprising transmitting, by a second slave communication unit, an encryption request including an identification of the second slave communication unit, either by:
  communicating directly to the master communication unit via a second slave communication link, or
  communicating indirectly to the master communication unit via the second slave communication link to the first slave communication unit and then via a first slave communication link,
  wherein the master communication unit is then configured to transmit the encryption key, based on the access criteria, either by:
    communicating directly to the second slave communication unit via the second slave communication link, or
    communicating indirectly to the second slave communication unit, via the first slave communication link to the first slave communication unit, and then via the second slave communication link,
  and wherein the second slave communication unit is then configured to eavesdrop the audio streaming signal being communicated via the second communication link between the audio gateway and the master communication unit.

15. A method according to claim 13, further comprising, by each of the communication units:
  receiving a voice of a user via a microphone and providing a first microphone signal including the voice of one or more users, and wherein the first wireless interface is transmitting the first microphone signal via a third slave communication link and/or receiving a second microphone signal via the third slave communication link, and
  combining the first microphone signal with at least the second microphone signal via a combiner unit, and
  wherein the master communication unit is configured to combine the first microphone signal with at least the second microphone signal from the first slave communication unit into a combined microphone signal, and wherein the master communication unit is then configured to transmit the combined microphone signal via the second communication link to the audio gateway.

* * * * *